Patented July 29, 1941

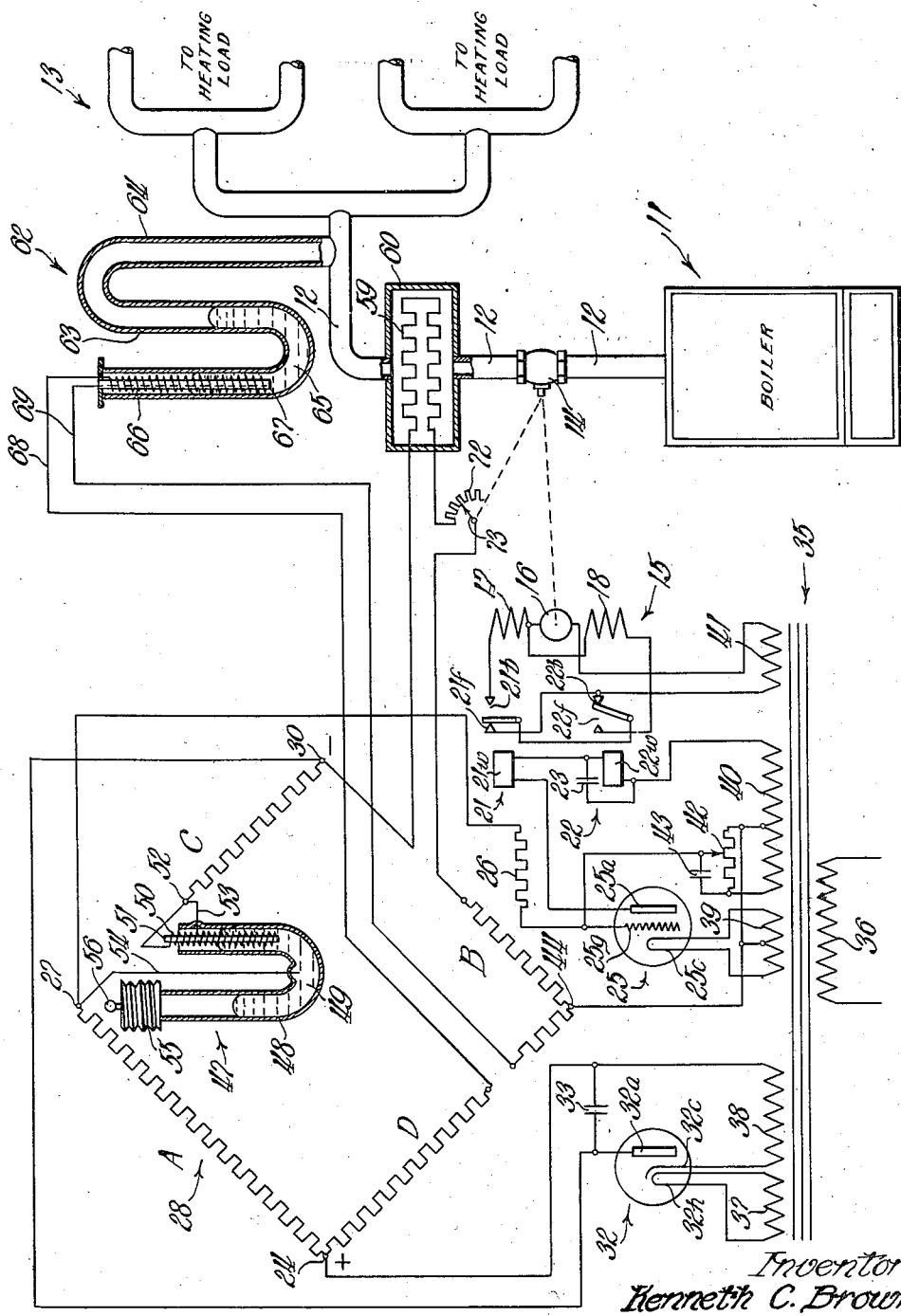

2,250,946

UNITED STATES PATENT OFFICE 2,250,946

HEAT AND PRESSURE CONTROL SYSTEM

Kenneth C. Brown, Evanston, and Fredric J. Weyher, Chicago, Ill.; said Weyher assignor to said Brown Application August 6, 1938, Serial No. 223,532

6 Claims. (Cl. 236—92)

Our invention relates, generally, to electrical control systems, and it has particular relation to such systems employed for controlling the heat that is supplied to a building or the like in accordance with one or more variable factors, such as variations in temperature and pressure.

In order to maintain a desired temperature in a building that is heated by a fluid heating system, certain varying factors are important in effecting the proper control of the amount of heat that is supplied to the building or other heating load from the fluid heating source. For example, the temperature outside the building constitutes an important factor in the control of the fluid heating system. Variations in the temperature outside of a building are, of course, reflected in the temperature inside of it. There is a certain amount of lag, depending upon the amount of heat that is transferred through the walls of the building. Variations in pressure in the fluid heating system should also be considered in regulating the functioning thereof. The functioning of the fluid heating system that is employed for supplying heat to the heating load should be arranged to be controlled in accordance with these varying factors in such manner that the desired temperature will be maintained in the building with a minimum amount of fuel being required to provide the same.

The object of our invention, generally stated, is to provide a heat control system that shall be simple and efficient in operation and which may be readily and economically manufactured and installed.

An object of our invention is to regulate the functioning of a fluid heating system in accordance with one or more varying factors in an improved manner.

Another object of our invention is to provide for automatically controlling the amount of heat that is supplied to a heating load by a heating system by using one or more manometer devices that are arranged to be responsive to one or more varying factors.

Still another object of our invention is to provide for controlling the amount of heat that is supplied to a heating load by means of a variable resistance manometer device connected in a Wheatstone bridge circuit.

Still another object of our invention is to jointly control the amount of heat that is supplied to a heating load by a fluid heating system in accordance with variations in temperature and variations in pressure in the fluid heating system.

Another object of our invention is to provide for controlling the amount of heat that is supplied to a heating load by a fluid heating system by means of a variable resistance manometer device disposed to be responsive to temperature and another variable resistance manometer device disposed to be responsive to variations in pressure in the fluid heating system.

Other objects of our invention will, in part, be obvious and in part appear hereinafter.

Our invention, accordingly, is disclosed in the embodiment hereof shown in the accompanying drawing, and it comprises the features of construction, combination of elements and arrangement of parts which will be exemplified in the system hereinafter set forth and the scope of the application of which will be indicated in the appended claims.

For a more complete understanding of the nature and scope of our invention, reference may be had to the following detailed description, taken in connection with the accompanying drawing, in which the single figure illustrates diagrammatically a concrete embodiment of our invention.

Referring now to the drawing, it will be observed that the reference character 11 designates, generally, a boiler, the construction of which is well known, which may be employed for heating water and supplying it through a pipe 12 to a heating load designated generally at 13. It will be understood that the heating load may be of various types. For example, it may comprise the radiators in a building that is to be heated by the boiler 11. It may also comprise an industrial heating load in which heat is required for carrying out certain operations, as will be readily understood. Provision may be made for returning the water to the boiler 11 after the heat has been removed therefrom by the heating load, if desired.

The amount of hot water that flows through the pipe 12, and, accordingly, the amount of heat that is supplied to the heating load 13, is controlled by a valve 14 that is connected to be operated by a reversible motor, shown generally at 15. It will be understood that a solenoid operating mechanism may be provided in lieu of the reversible motor 15. The motor 15 may be of any suitable type that can be readily reversed for operating the valve 14 to open or close it, as the case may be. For example, the motor 15 may be of the series type, having an armature 16 that is mechanically connected to the valve 14 and series field windings 17 and 18 that are commonly connected to the armature 16, as shown. It will be understood that, when the series field winding 17 and the armature 16 are energized, the armature 16 will rotate in such direction as to operate the valve 14 toward the closed position. Likewise, when the series field winding 18 and the armature 16 are energized, the armature 16 rotates in the opposite direction to open the valve 14.

The operation of the motor 15 is controlled by control relays, shown generally at 21 and 22. The relay 21 is provided with a winding 21w for operating front and back contact members 21f and 21b. The control relay 22 is likewise provided with a winding 22w for controlling the operation of front and back contact members 22f and 22b. In order to effect marginal operation of the relays 21 and 22, the windings 21w and 22w are provided, having different resistances. For example, the resistance of the winding 21w may be 1850 ohms, while the resistance of the winding 22w may be 2500 ohms. A capacitor 23 is connected across the winding 22w. For the particular values of resistances stated for the windings 21w and 22w, we have found that it is desirable to use, for the capacitor 23, one having a capacity of two microfarads. The particular arrangement of the relays 21 and 22 forms no part of the present invention.

With a view to controlling the energization of the windings 21w and 22w of the control relays 21 and 22, these windings are connected in series circuit relation and in series circuit relation with a valve, shown generally at 25. The electric valve 25 is provided with a cathode 25c, a control electrode 25g, and an anode 25a. By varying the conductivity of the electric valve 25, it is possible to selectively control the operation of the control relays 21 and 22 to in turn effect the selective operation of the motor 15 for operating it in either direction or for holding it stationary.

The control of the conductivity of the electric valve 25 is effected by controlling the potential that is applied to the control electrode 25g. As shown, the control electrode 25g is connected through a suitable resistor 26 to one terminal 27 of a Wheatstone bridge circuit, shown generally at 28. The Wheatstone bridge circuit 28 comprises arms A, B, C and D. By varying the resistances of certain of these arms, it is possible to change the potential of the control electrode 25g relative to the cathode 25c, as will be hereinafter set forth, with the result that the conductivity of the electric valve 25 is varied, as is well known.

The Wheatstone bridge 28 is preferably energized with direct current. For this purpose, its terminals 24 and 30 are connected across a suitable direct current source. For example, in order to provide a suitable source of direct current, a rectifier valve, shown generally at 32, may be provided, having an anode 32a, a cathode 32c, and a heater element 32h. Since the rectifier valve 32 is employed to provide half wave rectification of alternating current, a capacitor 33 is connected across its output circuit in order to reduce somewhat the ripple of the rectified half waves.

A transformer, shown generally at 35, is provided for energizing the electrical apparatus hereinbefore described. It has a primary winding 36 that may be connected to any suitable source of alternating current, such as a 60-cycle, 110-volt source. The transformer 35 is also provided with secondary windings 37 through 41. As illustrated, the secondary winding 37 is employed for energizing the heater element 32h of the rectifier valve 32, while the secondary winding 38 provides the source of alternating current that is rectified for energization of the Wheatstone bridge 28. The secondary winding 39 serves to energize the cathode 25c of the electric valve 25, while the secondary winding 40 provides the operating potential for the plate circuit of this valve, and is connected to one terminal of the winding 22w of the control relay 22. The secondary winding 41 serves to provide a source of alternating current for operating the series type motor 15. It will be observed that an adjustable resistor 42 and a capacitor 43 are connected to the secondary winding 40 and to the control electrode 25g for modifying the trigger action of the electric valve 25. The circuit for the control electrode 25g is completed by connecting the terminal 44 of the Wheatstone bridge 28 to a mid-point of the secondary winding 39.

As indicated hereinbefore, the conductivity of the electric valve 25 is changed by varying the potential that is applied to the control electrode 25g. This is effected by varying the resistances of certain of the arms A, B, C and D of the Wheatstone bridge 28.

In the arm C, a variable resistance manometer device, shown generally at 47, is connected. This device is intended to be placed outside of the building that is to be heated, assuming that this is the type of heating load in a particular case, and preferably it is positioned on the north side of the building, where it will not be affected by the direct heat of the sun and at some distance from the north wall, so that it will not be affected by the temperature of the building.

The variable resistance manometer device 47 may comprise a U-tube 48 formed, for example, of glass. It contains a body of mercury 49 the position of which changes in accordance with variations in outside temperature.

A resistance element 50, in the form of a coil of wire having a comparatively high resistance, is wound about a suitable support 51 and partially immersed in the mercury 49. It will be understood that variations in the level of the mercury in the right-hand column of the U-tube 49 will cause more or less turns of the resistance element 50 to be short-circuited. As shown, the upper terminal of the element 50 is connected to a terminal 52 in the arm C and a conductor 53 connects this terminal 52 to a point intermediate the ends of the element 50. It will be understood that this connection may be adjusted as desired. A conductor 54 serves to connect the body of mercury 49 to the terminal 27 of the Wheatstone bridge 28. The left-hand arm of the U-tube 48 is provided with a flexible bellows 55 and an adjusting screw 56 for varying the operation of the manometer device 47. It will be understood that variations in outside temperature will cause corresponding variations in the level of the mercury 49 in the arms of the U-tube 48. For example, on increase in temperature the air above the mercury in the left-hand arm will be expanded and the level of the mercury therein will be decreased, while the level of the mercury in the other arm will be increased to short circuit a greater number of turns of the resistance element 50 and correspondingly reduce the resistance in the arm C of the Wheatstone bridge 28. Likewise, when the temperature decreases, a reverse operation takes place and the resistance of the arm C is increased.

In order to control the functioning of the motor 15 and the valve 14 in accordance with the temperature of the water that flows from the boiler 11 through the pipe 12, a resistor 59 is provided in a suitable housing 60 through which the heated water flows, the resistor 59 being so positioned that its temperature will be that of the water and yet insulated therefrom in a suitable manner. The resistor 59 is connected in the arm B and is preferably formed of a material having a high temperature coefficient of resistance.

As indicated hereinbefore, it is desirable to control the functioning of the fluid heating system in accordance with variations in pressure therein. For this purpose, the variable resistance manometer device, shown generally at 62, is provided. This device comprises a U-tube 63, which can be formed of glass, having an extension 64 for connection to the pipe 12. A body of mercury 65 is provided in the U-tube 63 for variably short-circuiting turns of a resistor element 66 partially immersed therein. As shown, the element 66 may be wound on a suitable support rod 67. Conductors 68 and 69 serve to connect the element 66 into the arm D of the Wheatstone bridge 28. It will be understood that variations in pressure in the pipe 12 will cause corresponding variations in the levels of the mercury 65 in the arms of the U-tube 63. For example, on increase in pressure in the pipe 12, the mercury in the right-hand arm of the U-tube 63 will be depressed, while the level in the left-hand arm will be raised, to short-circuit more turns of the element 66 and, consequently, decrease the resistance of the arm D of the Wheatstone bridge 28. Likewise, on lowering of the pressure in the pipe 12, the number of turns of the element 66 short-circuited is decreased and the resistance of the arm D is correspondingly increased.

With a view to further controlling the conductivity of the electric valve 25 and increasing its effectiveness in controlling the functioning of the control relays 21 and 22, a variable resistor 72 is connected in the arm B of the Wheatstone bridge 28, the movable arm 73 of the variable resistor 72 being mechanically connected to the valve 14 so that, on operation of said valve by the motor 15, the arm 73 is also moved. The arrangement is such that the resistance of the arm B is increased by movement of the arm 73 in a clockwise direction on operation of the valve 14 to the open position. A reverse movement of the arm 49 takes place when the motor 15 drives the valve 14 toward the closed position.

In describing the operation of the heat control system, it will be assumed that initially the front contact members 21f of the control relay 21 are closed, and that the back contact members 22b of the control relay 22 are closed. Under these conditions, sufficient current is permitted to flow through the electric valve 25 to energize the winding 21w sufficiently to maintain its front contact members 21f closed, but an insufficient amount of current flows through the winding 22w to open its back contact members 22b and close its front contact members 22f. It will be apparent that neither of the windings 17 or 18 of the motor 15 will be connected for energization to the secondary winding 41 of the transformer 35, under these conditions. Therefore, the armature 16 is stationary and no movement of the valve 14 is taking place.

Assuming now that the outside temperature decreases, the pressure on the mercury in the left-hand arm of the variable resistance manometer device 47 is lowered and the mercury level therein rises and is lowered in the right hand arm. Consequently, the resistance of the element 50 in the arm C is increased and a corresponding decrease takes place in the potential that is applied to the control electrode 25g. As a result, the conductivity of the electric valve 25 is increased to such an extent that sufficient current flows through its plate circuit as will sufficiently energize the winding 22w to open its back contact members 22b and close its front contact members 22f. On closure of the front contact members 22f, an obvious circuit will be completed for energizing the series field winding 18 and the armature 16 which, as indicated hereinbefore, causes the motor 15 to operate the valve 14 toward the open position, thereby permitting more hot water to flow to the heating load 13 in anticipation of the added heat required for maintaining the temperature of the building at the desired point. At the same time, the arm 73 is moved in a clockwise direction so that the resistance of the variable resistor 72 in the arm B is increased, with the result that the potential applied to the control electrode 25g is increased and the conductivity of the electric valve 25 is decreased. When the conductivity of the electric valve 25 is decreased to a predetermined extent, both of the control relays 21 and 22 drop out, thereby opening their front contact members 21f and 22f and closing their back contact members 21b and 22b.

It will now be apparent that a circuit is completed for energizing the series field winding 17 and the armature 16 because of the closure of both sets of back contact members 21b and 22b and, as a result, the valve 14 will be operated toward the closed position. At the same time, the arm 73 will be rotated in a counterclockwise direction to decrease the resistance of the resistor 72 in the arm B of the Wheatstone bridge 28. The motor 15 continues to close the valve 14 until the potential applied to the control electrode 25g decreases to an extent sufficient to increase the conductivity of the electric valve 25. Sufficient current is then permitted to flow through it to energize the operating winding 21w of the control relay 21, and its back contact members 21b are opened and its front contact members 21f are closed. While this current flows through the winding 22w of the relay 22 also, it is not sufficient to pick it up. As a result of the opening of the back contact members 21b, the motor 15 is deenergized and remains in this condition until the resistances of the resistors in the arms B, C and D of the Wheatstone bridge 28 change in such manner as to call for further closing of the valve 14 or opening it again.

The functioning of the variable resistance manometer device 62 is similar to that of the device 47. On increase in pressure in the pipe 12, the mercury 65 in the U-tube 63 is depressed in the right-hand arm and its level is raised in the left-hand arm, thereby short-circuiting additional turns of the element 66. The resistance of the arm D is correspondingly decreased, with the result that the potential applied to the control electrode 25g is increased. Assuming that the relays 21 and 22 are in the positions shown in the drawing, this increased potential applied to the control electrode 25g will cause the relay 21 to drop out, since the conductivity of the electric valve 25 will have been decreased to such an extent that sufficient current no longer flows through the winding 21w to hold the contact members 21f in the closed position. On closure of back contact members 21b, the series field winding 17 and armature 16 are energized and the valve 14 is operated toward the closed position.

Since certain changes may be made in the above system and different embodiments of the invention may be made without departing from the scope thereof, it is intended that all matter contained in the foregoing description or shown in the accompanying drawing shall be interpreted as illustrative, and not in a limiting sense.

We claim as our invention:

1. In a control apparatus for a closed hot water heating system including a boiler from which heating fluid is supplied to a building, the combination of a bridge network provided with elements having resistances responsive respectively to the heating fluid pressure at the heated space and to the temperature at which heat is supplied from said boiler, electron discharge means provided with an input circuit responsive to change in potential of said network and with an output circuit, means for varying the amount of heat supplied to said building, and means responsive to the current of said electron discharge device output circuit for controlling the operation of said heat varying means.

2. In a control apparatus for a closed hot water heating system including a valve arranged to regulate the interchange of heating fluid between a boiler and a heat radiator, the combination of a bridge network provided with output terminals and with a plurality of arms having their resistances varied respectively in response to temperature outside the heated structure, to heating fluid temperature at the boiler and to heating fluid pressure at the radiator, an electron discharge device provided with an input circuit connected to said bridge output terminals and with an output circuit, and means connected in said electron discharge device output circuit for operating said valve.

3. In a control apparatus for a closed hot water heating system including a valve arranged to regulate the interchange of heating fluid between a boiler and a heat radiator, the combination of a bridge network provided with output terminals and with a plurality of arms having their resistances varied respectively in response to temperature outside the heated structure, to heating fluid temperature at the boiler and to heating fluid pressure at the radiator, an electron discharge device provided with an input circuit connected to said bridge output terminals and with an output circuit, means connected in said electron discharge device output circuit for operating said valve, and means for varying the resistance of one of said arms in response to operation of said valve.

4. In a control apparatus for a closed hot water heating system including a valve arranged to regulate the interchange of heating fluid between a boiler and a heat radiator, the combination of a bridge network provided with output terminals and with a plurality of arms having their resistances varied respectively in response to temperature outside the heated structure, to heating fluid temperature at the boiler and to heating fluid pressure at the radiator, an electron discharge device provided with an input circuit connected to said bridge output terminals and with an output circuit, means connected in said electron discharge device output circuit for operating said valve, and means responsive to operation of said valve for varying the resistance of said boiler heating fluid temperature responsive arm.

5. In a control apparatus for a closed hot water heating system including a valve arranged to regulate the interchange of heating fluid between a boiler and a heat radiator, the combination of a bridge network provided with output terminals and with a plurality of arms having their resistances varied respectively in response to temperature outside the heated structure, to heating fluid temperature at the boiler and to heating fluid pressure at the radiator, an electron discharge device provided with an input circuit connected to said bridge output terminals and with an output circuit, means connected in said electron discharge device output circuit for operating said valve, and a resistor mechanically coupled to said valve for increasing the resistance of one of said arms as said valve opens and decreasing the resistance of said arm as said valve closes.

6. In a control apparatus for a closed hot water heating system including a valve arranged to regulate the interchange of heating fluid between a boiler and a heat radiator, the combination of a bridge network provided with output terminals and with a plurality of arms having their resistances varied respectively in response to temperature outside the heated structure, to heating fluid temperature at the boiler and to heating fluid pressure at the radiator, an electron discharge device provided with an input circuit connected to said bridge output terminals and with an output circuit, means connected in said electron discharge device output circuit for operating said valve, and means connected in said electron discharge device input circuit for adjusting the bridge output terminal voltage at which operation of said valve is initiated.

KENNETH C. BROWN.
FREDRIC J. WEYHER.